F. X. SCHWEICKERT.
ARTIFICIAL BAIT.
APPLICATION FILED FEB. 24, 1914.
1,177,281.
Patented Mar. 28, 1916.
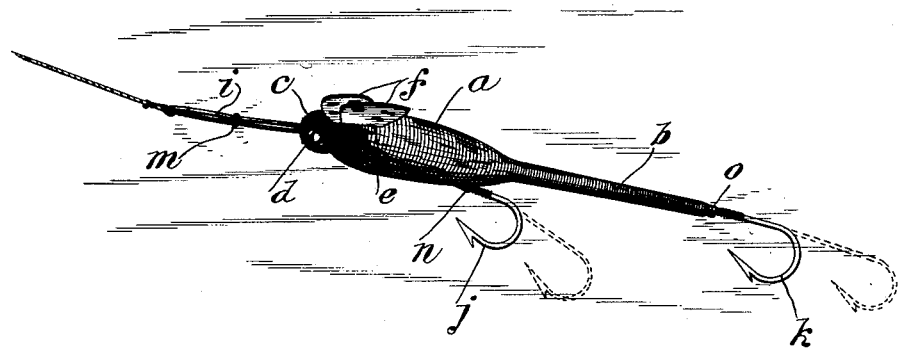
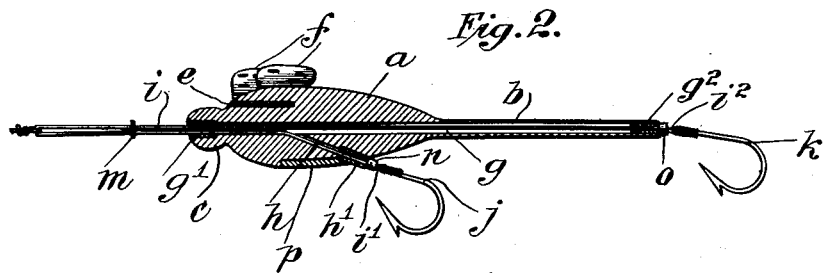
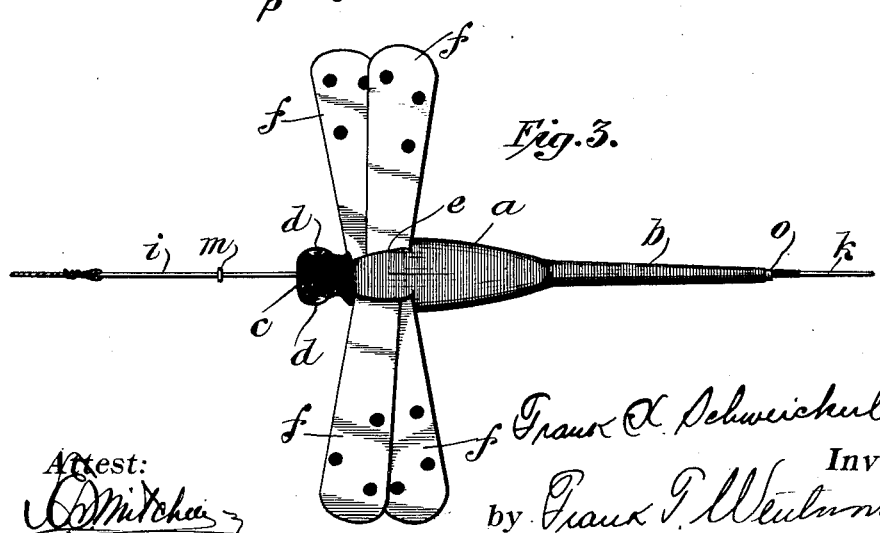

UNITED STATES PATENT OFFICE.

FRANK X. SCHWEICKERT, OF BLOOMFIELD, NEW JERSEY.

ARTIFICIAL BAIT.

1,177,281.      Specification of Letters Patent.      Patented Mar. 28, 1916.

Application filed February 24, 1914. Serial No. 820,395.

*To all whom it may concern:*

Be it known that I, FRANK X. SCHWEICKERT, a citizen of the United States, residing at Bloomfield, in the county of Essex and State of New Jersey, have invented certain new and useful Improvements in Artificial Baits, of which the following is a specification, reference being had therein to the accompanying drawings, which form a part thereof.

My invention relates to artificial baits and more particularly to a surface bait, and one which is especially adapted for use in "casting".

In "casting" for fresh water bass, whether for big-mouthed black bass or the brown Oswego bass, it is necessary to use an entirely different type of bait from that which is used in trolling for fish of this type. While in trolling, artificial bait may take the form of spoons or other types of spinners, or bait simulating live bait in the form of fish; it is necessary, in casting, to use a surface bait, and by my invention, I provide a bait, the essential characteristics of which are its capability of remaining upon the surface of the water, its resemblance to a dragon fly or "devil's darning needle", and its tendency to pass through the air in a manner to light gently upon the water with the hooks in the proper position and the body in a position simulating, in a measure, the movements of the dragon fly itself. To secure these results it is essential to construct the artificial bait made in accordance with my invention, so that the wings will in a measure give a poise to, and guide the course of, the bait in casting, thus causing it to alight upon the water with ease and right side up, without submerging the entire bait. To insure the proper flight and position of the bait in alighting upon the water, I provide a small ballast directly below the point of attachment of the wings. It is also desirable in a bait of this character to so mount the hooks with relation to the body of the bait that if the fish strikes the bait, he will force it away from the hooks, or if he takes the hook and a portion of the bait, he will in trying to throw off the hooks, merely throw the bait away from them, and thus prevent the mutilation of the body portion of the bait. To insure the proper movement of the bait relative to the hooks and prevent the breaking of the body portion of the bait through movement of the hook, I provide ferrules in which the metallic snell carrying the hooks is slidably mounted. The elongated portion of the metallic snell, projecting forwardly of the body of the bait being subjected to such stresses as would tend to bend or twist it, I contemplate the use of means for preventing the twisting of the portion of the snell to which line is attached, which means is freely slidable upon the snell and is adapted to be positioned centrally of the portion thereof in advance of the bait proper, I also provide washers adapted to be interposed between the body of the bait and the hooks so as to prevent the binding of the hooks in the ferrules in a manner to prevent the free sliding movement of the body portion of the bait upon said snell.

The invention consists primarily in an artificial bait embodying a body portion formed to simulate the body of a dragon fly, laterally extending wings projecting beyond opposite sides thereof, hooks projecting from the tail and from below the body portion intermediate the head and tail thereof, and means for attaching a line adjacent the head of said bait; and in such other novel features of construction and combination of parts as are hereinafter set forth and described and more particularly pointed out in the claims hereto appended.

Figure 1 is a side view of an artificial bait embodying my invention; Fig. 2 is a longitudinal section thereof; and Fig. 3 is a plan view thereof.

Like letters refer to like parts throughout the several views.

In the embodiment of my invention shown in the drawings, $a$ indicates the body portion of the bait having the attenuated tail portion $b$ and the head portion $c$ provided with eyes as $d$. The entire body portion may be made of any desired buoyant material such as cork or other wood. If desired this body portion may be strengthened or reinforced by being wound with silk, linen or any other desired material, although this winding is non-essential to my invention. The body portion $a$ at the top thereof directly back of the head is provided with a sawcut $e$ by means of which the wings $f$ of celluloid, or other semi-transparent, waterproof sheet material, are attached to the body portion to simulate the wings of the fly, these wings being glued or cemented in place. By locating the wings in the manner and in the position described not only is a resemblance of the bait to the dragon fly increased but these wings are held above the surface of the water when the bait is cast and also serve to support the bait while in the air in a manner to give it the desired poise and cause it to alight gently upon the water right side up.

The entire body portion has a passage $g$ such as a hole drilled or otherwise formed longitudinally of, and opening outwardly through the forward part of the head and through the apex of the attenuated portion $b$ of the body. Leading from this hole is an outwardly directed passage $h$ opening outwardly of the bottom portion of the body forwardly of said attenuated portion.

Slidably mounted in the passages $g$—$h$ is a metallic snell $i$ of a length to extend well in advance of the head $c$ and having secured to the ends thereof the hooks $j$—$k$. This snell is formed of a continuous strand of flexible wire, looped upon itself to form means for attaching the line thereto. The length of the doubled wire in advance of the head when the hooks are close to the bait is sufficiently great to result in a tendency of the wires to twist and thus prevent their sliding freely into the passage $g$. To obviate this condition, I mount upon said snell adjacent the loop thereof a sliding keeper $m$ adapted to be positioned in advance of the head and thus hold the two strands of the wire between the loop and head in a parallel position, or against such twisting.

To protect the body portion of the bait, I provide the ends of the passages $g$—$h$ with metallic ferrules $g'$, $g^2$, and $h'$.

Ordinarily the hooks $j$—$k$ are attached to the ends $i'$, $i^2$ of the snell by being soldered or brazed thereto, and to prevent the enlargement at the point of connection of the hook with the snell from wedging in the ferrules $h'$—$g^2$, I mount upon said snell the movable washers $n$—$o$ which are interposed between the hook and the said ferrules.

In order to preserve a proper balance of the bait when casting, I provide a slight ballast in the form of the small weight $p$ in the bottom of the body portion $a$ directly below the slot $e$ for the wings $f$; this weight, however, being insufficient to submerge the bait upon, or after, its alighting upon the water.

The body portion $a$—$b$ of the bait may be made of various bright colors, such as blue or green and the wings may be spotted or not as desired. The particular coloring of the bait is non-essential, and may be varied according to the season, location or other conditions, or at will.

The operation of the herein described bait is apparent from the foregoing description and it is necessary merely to supplement said description by pointing out that the bait in use when cast through the air will be poised by the wings $f$ and the ballast $p$ so as to glide through the air and take the water without unnecessary disturbance. After the bait alights, the body portion $a$ being buoyant will sustain it upon the surface of the water with the wings above the surface and the hooks submerged.

When a fish rises to this bait it is apt to strike the bait itself and after it has taken the bait in its efforts to disgorge the hook, it will merely throw the bait away from the hooks and thus prevent injury thereto by reason of the free slidability of the body of the bait along the snell.

I believe it to be broadly new to provide a surface bait, the construction of which is such as to make it resemble, both in appearance and in its manner of floating upon the water, the dragon fly, and I intend to claim such broadly.

In actual practice I have found that a bait made in accordance with my invention is very effective in bass fishing, as to either black or Oswego bass.

Having described my invention what I claim as new and desire to have protected by Letters Patent is:—

1. An artificial bait embodying therein an elongated body of buoyant material, a plurality of hooks projecting from the rear end of said body portion and from below said body portion, means at the forward end of said body portion whereby a line may be attached thereto, and a plurality of narrow, semi-transparent, slightly flexible vanes secured to the upper part of said body portion, adjacent the forward end thereof whereby upon the casting of the bait said vanes will poise the bait and will have a slight vibratory action when passing through the air and said body portion if the bait lies upon the water will support said wings above the water.

2. An artificial bait embodying therein an elongated body or buoyant material, a plurality of hooks projecting from the rear end of said body portion and from below said body portion, means at the forward end of said body portion whereby a line may be attached thereto, a plurality of narrow, semi-transparent, slightly flexible vanes secured to the upper part of said body portion, adjacent the forward end thereof whereby upon the casting of the bait said vanes will poise the bait and will have a slight vibratory action when passing through the air and said body portion, if the bait lies upon the water, will support said wings above the water, and a light ballast upon the under side of said body portion whereby rotative movement of said bait when casting is prevented.

3. An artificial bait embodying therein a buoyant body portion formed to simulate the body of a dragon fly and having two passages extending therethrough one of which opens outwardly of the head and the tail, and the other of which extends downwardly from said first named passage and opens outwardly of the bottom of the body portion intermediate the head and tail, a metallic snell slidably mounted in said passage, hooks carried by the ends of said snell and laterally extending semi-transparent wings projecting beyond opposite sides of said body portion.

4. An artificial bait embodying therein a buoyant body portion formed to simulate the body of a dragon fly and having two passages extending therethrough, one of which opens outwardly of the head and the tail, and the other of which extends downwardly from said first named passage and opens outwardly of the bottom of the body portion intermediate the head and tail, a metallic snell slidably mounted in said passages, hooks carried by the ends of said snell, and washers mounted upon said snell adjacent said hooks and exteriorly of said body portion.

5. An artificial bait embodying therein a buoyant body portion formed to simulate the body of the dragon fly and having two holes extending therethrough, one of which opens outwardly of the head and the tail, and the other of which extends downwardly from said first named hole and opens outwardly of the bottom of the body portion intermediate the head and tail, ferrules embedded in said body about the ends of said holes, a metallic snell formed of a continuous strand slidably mounted in said holes with a loop portion thereof in advance of the head of said body portion, hooks carried by the ends of said snell and laterally extending semi-transparent wings projecting beyond opposite sides of said body portion.

In witness whereof I have hereunto affixed my signature in presence of two subscribing witnesses this 20th day of February, 1914.

FRANK X. SCHWEICKERT.

Witnesses:
WILLIAM F. REDPATH,
CHAS. E. CROZIER.